J. U. WELLS.
PNEUMATIC VEHICLE WHEEL.
APPLICATION FILED JULY 12, 1913.
1,079,082.
Patented Nov. 18, 1913.
2 SHEETS—SHEET 1.
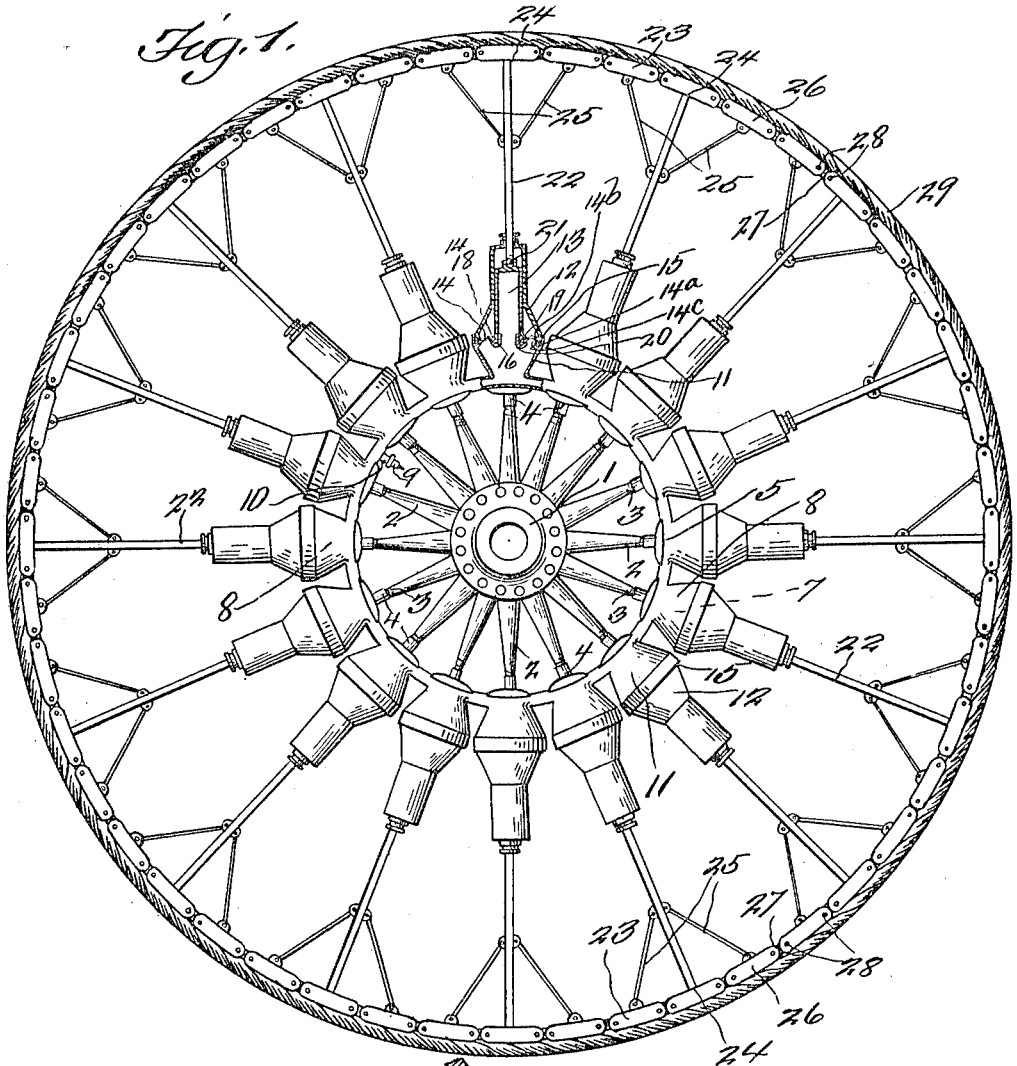

J. U. WELLS.
PNEUMATIC VEHICLE WHEEL.
APPLICATION FILED JULY 12, 1913.
1,079,082.
Patented Nov. 18, 1913.
2 SHEETS—SHEET 2.
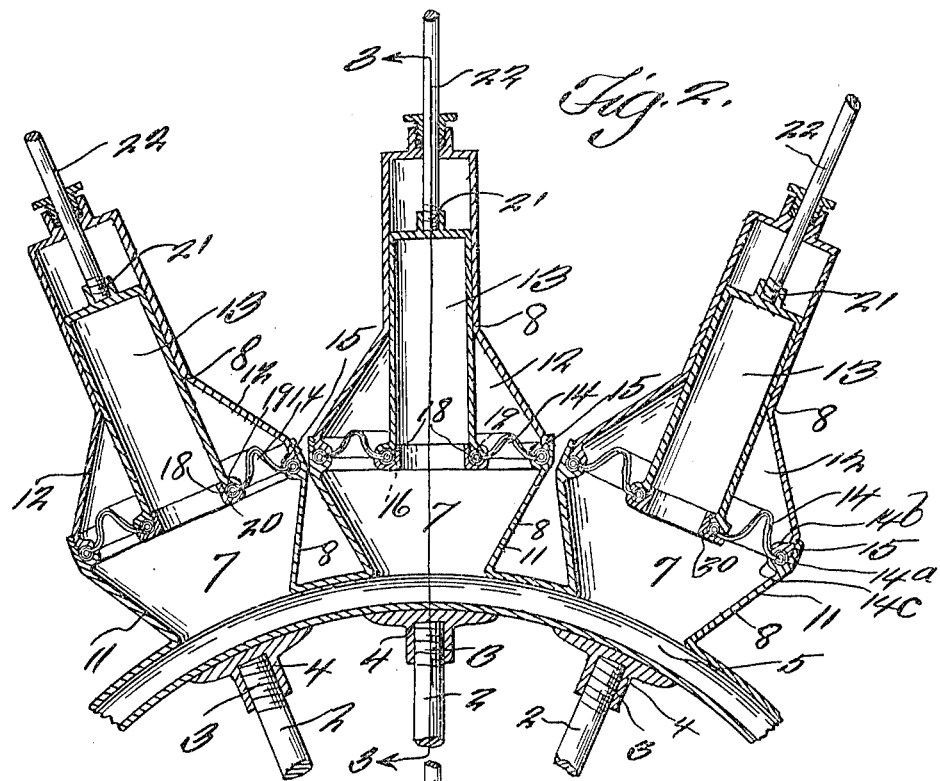
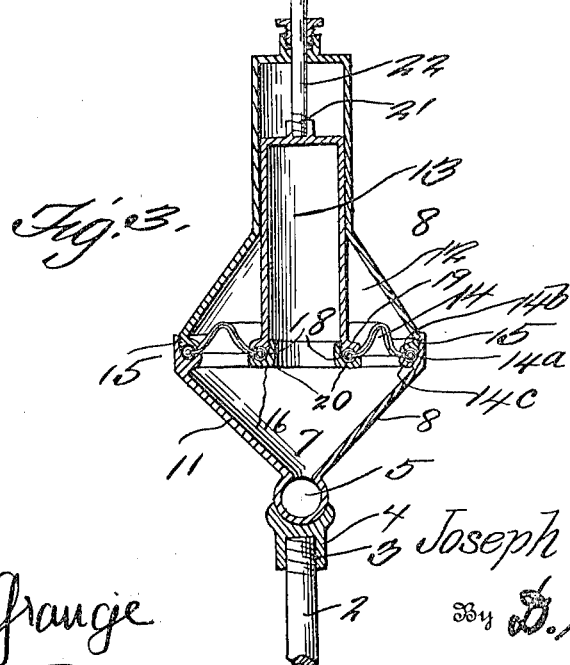
Witnesses
Mark DeGrange
Inventor
Joseph U. Wells,
By D. Swift &C.
Attorneys

UNITED STATES PATENT OFFICE.

JOSEPH U. WELLS, OF FALLEN LEAF, CALIFORNIA.

PNEUMATIC VEHICLE-WHEEL.

1,079,082.    Specification of Letters Patent.    Patented Nov. 18, 1913.

Application filed July 12, 1913. Serial No. 778,703.

*To all whom it may concern:*

Be it known that I, JOSEPH U. WELLS, a citizen of the United States, residing at Fallen Leaf, in the county of Eldorado and State of California, have invented a new and useful Pneumatic Vehicle-Wheel; and I do hereby declare the following to be a full, clear, and exact description of the invention, such as will enable others skilled in the art to which it appertains to make and use the same.

This invention relates to the art of vehicle wheels, and particularly to a pneumatic wheel.

One of the features of construction is the provision of a multiple of pump cylinders communicating in a series, each having a floating flexible web of any suitable material arranged therein at one end, to which the cylinder piston is connected, which in turn is connected to the rim of the wheel by a rod. When the wheel is in action, the pistons are forced toward the hub of the wheel, owing to the tire engaging the ground, thereby compressing the air in the air chambers, and owing to the webbing being flexible, full in area and floatable adjacent their central portions, the webbing will act accordingly, thereby cushioning the wheel as it rotates. In this manner the air is compressed and displaced from one chamber to another.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a view in side elevation and partly in section of the improved wheel constructed in accordance with the invention. Fig. 2 is an enlarged sectional view of a portion of the wheel. Fig. 3 is a sectional view on line 3—3 of Fig. 2. Fig. 4 is a detail view.

Referring more particularly to the drawings, 1 designates the hub of the wheel constructed in the usual manner and provided with short radial spokes 2, which are secured at 3 in the thimbles or ferrules 4, which are connected to the band 5 in any suitable manner. The rim 5 is hollow or tubular and constitutes an air conduit, the interior of which communicates with the air chamber 7 of each cylinder 8. The thimbles or ferrules where they engage the tubular rim or conduit are slightly elongated, and are also semi-circular in cross section to conform to the contour of the conduit. The air conduit or rim 5 is provided with the usual check valve 9 in a short tube 10, and to which tube 10 the usual form of pump may be connected for forcing air into the conduit and the chambers. Each cylinder 8 comprises two sections 11 and 12, the section 11 is connected to the conduit or rim 5, while in the section 12 a cylinder piston 13 is mounted and adapted to move. Arranged across the larger portion of each section 11, and securely clamped between the adjacent portions of the sections 11 and 12 of each cylinder is a webbing 14, which may be constructed of any suitable material, such as a composition of leather and canvas, or one piece of leather and one or several pieces of canvas. The two sections 11 and 12 are threaded together or otherwise connected as at 15. The central portion of the webbing is floatable and constructed with an opening 16. The webbing adjacent the periphery or edge of the opening is turned about a ring 18, which, together with the webbing is clamped to the piston as at 19 by the ring 20. Between the piston 13 and threaded portion where the webbing is connected to the cylinder, the webbing is not only floatable, but flexible and pliable, as well as being distended, so as to act properly in conjunction with the piston 13, when compressing the air in the chamber 7, and from one chamber to another. The piston of each cylinder is connected at 21 to a rod 22. These rods 22 are in turn connected to the outer rim 23 as shown at 24, and also braced relative to the outer rim by the rods 25. The outer rim is constructed of a plurality of sections 26, connected in sequence by the members 27 and rivets or bolts 28. The outer rim 23 is provided with a tire constructed of wire cable or the like, thereby affording means to prevent skidding.

The invention having been set forth, what is claimed as new and useful is:—

In improvements in pneumatic vehicle wheels, a circular conduit hub rim having a circular hub chamber, a plurality of cylinders connected to the hub rim and communicating with the hub chamber, each of said cylinders comprising an inner and outer section threaded together and having interior clamping flanges, the inner section being of a frusto conical shape, while the outer sections are likewise shaped but in the opposite direction and terminating in cylindrical-shaped portions, cylindrical hollow pistons operable in the cylindrical-shaped portions of the outer sections, the inner end of each piston being open and provided with an annular clamping flange and clamping ring, a floatable webbing clamped between the clamping flanges of said sections of each cylinder, said webbing having a central opening, the peripheral portion of which being clamped between the clamping ring and the clamping flange of each piston, a flexible wheel rim, and connecting members extending through the outer end of the cylindrical portions of the outer sections connecting said flexible wheel rim and the pistons, said floatable webbing dividing each cylinder in an air chamber and a piston chamber.

In testimony whereof I have signed my name to this specification in the presence of two subscribing witnesses.

JOSEPH U. WELLS.

Witnesses:
 FLORENCE E. CELIO,
 A. P. SARTORI.

Copies of this patent may be obtained for five cents each, by addressing the "Commissioner of Patents, Washington, D. C."